United States Patent
Shubhi et al.

(10) Patent No.: US 12,284,612 B2
(45) Date of Patent: Apr. 22, 2025

(54) WAKE-UP SIGNAL MONITORING OPTIMIZATION

(71) Applicant: Telefonaktiebolaget LM Ericsson (publ), Stockholm (SE)

(72) Inventors: Ilmiawan Shubhi, Malmö (SE); Sina Maleki, Malmö (SE); Andres Reial, Höllviken (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/769,391

(22) PCT Filed: Nov. 27, 2019

(86) PCT No.: PCT/EP2019/082719
§ 371 (c)(1),
(2) Date: Apr. 15, 2022

(87) PCT Pub. No.: WO2021/104616
PCT Pub. Date: Jun. 3, 2021

(65) Prior Publication Data
US 2024/0137868 A1    Apr. 25, 2024
US 2024/0236855 A9    Jul. 11, 2024

(51) Int. Cl.
*H04W 52/02* (2009.01)

(52) U.S. Cl.
CPC .............................. *H04W 52/0235* (2013.01)

(58) Field of Classification Search
CPC ... H04W 52/0235; H04W 52/02; Y02D 30/70
See application file for complete search history.

(56) References Cited

U.S. PATENT DOCUMENTS

| | | |
|---|---|---|
| 11,849,460 B2 | 12/2023 | Kim et al. |
| 2019/0239189 A1 | 8/2019 | Hwang et al. |
| 2019/0254110 A1* | 8/2019 | He ............... H04L 41/0896 |
| 2019/0297577 A1 | 9/2019 | Lin et al. |
| 2020/0037396 A1* | 1/2020 | Islam ............ H04W 52/0229 |
| 2020/0150073 A1 | 5/2020 | Nam et al. |

(Continued)

FOREIGN PATENT DOCUMENTS

| | | |
|---|---|---|
| WO | 2018174635 A1 | 9/2018 |
| WO | 2018204799 A1 | 11/2018 |

(Continued)

OTHER PUBLICATIONS

"Saving Energy in Cellular IoT using Low-Power Wake-up Radios"; Ray et al.; Department of Electrical and Information Technology Lund University; Aug. 31, 2018 (Year: 2018).*

(Continued)

*Primary Examiner* — Benjamin H Elliott, IV
(74) *Attorney, Agent, or Firm* — COATS & BENNETT, PLLC

(57) ABSTRACT

Methods and apparatus are described for adapting wake-up signal monitoring to optimize power saving performance. In one embodiment, a UE can be configured to selectively skip WUS monitoring based on a current UE context. In another embodiment, WUS/PDCCH monitoring and/or other UE procedure can be adapted based on a statistic related to the wake-up signals transmitted by the base station to the UE.

19 Claims, 7 Drawing Sheets

(56) References Cited

U.S. PATENT DOCUMENTS

| | | | |
|---|---|---|---|
| 2020/0150736 A1 | 5/2020 | Nam et al. | |
| 2020/0229092 A1* | 7/2020 | Wu | H04B 7/0413 |
| 2020/0351777 A1 | 11/2020 | Kim et al. | |
| 2020/0351784 A1* | 11/2020 | Tsai | H04W 76/28 |
| 2020/0359314 A1* | 11/2020 | Wu | H04W 76/28 |
| 2020/0367167 A1 | 11/2020 | Nam et al. | |
| 2020/0389874 A1* | 12/2020 | Lin | H04W 72/23 |
| 2020/0396685 A1 | 12/2020 | Nam et al. | |
| 2021/0037529 A1* | 2/2021 | Park | H04W 8/24 |
| 2021/0051584 A1* | 2/2021 | Cheng | H04W 76/28 |
| 2021/0051589 A1 | 2/2021 | Nam et al. | |
| 2021/0084590 A1 | 3/2021 | Nam et al. | |
| 2021/0120488 A1 | 4/2021 | Zhou et al. | |
| 2021/0259044 A1 | 8/2021 | Islam et al. | |
| 2021/0306951 A1 | 9/2021 | Hwang et al. | |
| 2021/0314084 A1 | 10/2021 | Hwang et al. | |
| 2021/0314866 A1 | 10/2021 | Lee et al. | |
| 2021/0329555 A1 | 10/2021 | Jiang | |
| 2021/0377854 A1 | 12/2021 | Hwang et al. | |
| 2022/0007292 A1* | 1/2022 | Seo | H04W 52/0241 |
| 2022/0061033 A1* | 2/2022 | Lin | H04L 5/0094 |
| 2022/0078879 A1 | 3/2022 | Nimbalker et al. | |
| 2022/0110054 A1 | 4/2022 | Seo et al. | |
| 2022/0116876 A1 | 4/2022 | Sun et al. | |
| 2022/0124623 A1 | 4/2022 | Seo et al. | |
| 2022/0150836 A1 | 5/2022 | Seo et al. | |
| 2022/0159574 A1 | 5/2022 | Islam et al. | |
| 2022/0174651 A1* | 6/2022 | Seo | H04W 76/28 |
| 2022/0182936 A1 | 6/2022 | Maleki et al. | |
| 2022/0191793 A1 | 6/2022 | Murray et al. | |
| 2022/0201649 A1 | 6/2022 | Cox et al. | |
| 2022/0217628 A1 | 7/2022 | Shubhi et al. | |
| 2022/0217636 A1* | 7/2022 | Shrivastava | H04L 1/1812 |
| 2022/0232536 A1* | 7/2022 | Lin | H04W 80/08 |
| 2022/0232663 A1 | 7/2022 | Koskinen et al. | |
| 2022/0264460 A1 | 8/2022 | Seo et al. | |
| 2022/0279445 A1 | 9/2022 | Shrivastava et al. | |
| 2022/0303795 A1* | 9/2022 | Bala | H04W 24/08 |
| 2022/0312325 A1 | 9/2022 | Turtinen et al. | |
| 2022/0322232 A1 | 10/2022 | Li | |
| 2022/0346017 A1 | 10/2022 | Frederiksen et al. | |
| 2022/0353809 A1 | 11/2022 | Maleki et al. | |
| 2022/0369298 A1* | 11/2022 | Lin | H04W 48/16 |
| 2022/0394614 A1 | 12/2022 | Hwang et al. | |
| 2022/0394616 A1 | 12/2022 | Maleki et al. | |
| 2022/0400433 A1 | 12/2022 | Xu et al. | |
| 2023/0075265 A1* | 3/2023 | Nam | H04W 76/28 |
| 2023/0131118 A1 | 4/2023 | Kim et al. | |
| 2023/0134762 A1 | 5/2023 | Koskela et al. | |
| 2023/0179387 A1* | 6/2023 | Papasakellariou | H04L 5/0053 370/329 |
| 2023/0232331 A1* | 7/2023 | Seo | H04W 52/028 370/328 |
| 2024/0137868 A1* | 4/2024 | Shubhi | H04W 52/0235 |
| 2024/0147368 A1* | 5/2024 | Shubhi | H04W 52/0235 |
| 2024/0196327 A1 | 6/2024 | Li et al. | |

FOREIGN PATENT DOCUMENTS

| | | |
|---|---|---|
| WO | 2019145437 A1 | 8/2019 |
| WO | 2020173915 A1 | 9/2020 |

OTHER PUBLICATIONS

Catt, "Discussion on requirements for PDCCH-based power saving signal channel", 3GPP TSG-RAN WG4 Meeting #93, Nov. 18-22, 2019, pp. 1-2, Reno, US, R4-1913697.

Interdigital, Inc., "PDCCH-based Power Saving Signal Design", 3GPP TSG RAN WG1 #98bis, Oct. 14-20, 2019, pp. 1-8, Chongqing, China, R1-1910911.

Ericsson, "Design of PDCCH-WUS", 3GPP TSG-RAN WG1 Meeting #99, Nov. 18-22, 2019, pp. 1-13, Reno, US, R1-1912780.

Ericsson, "Wake-up signal configurations and procedures for NB-IoT", 3GPP TSG-RAN WG1 Meeting #92, Athens, Greece, Feb. 26-Mar. 2, 2018, R1-1801489, pp. 1-9.

Vivo, "Remaining aspects of PDCCH-based power saving signal", 3GPP TSG RAN WG1 #99, Reno, USA, Nov. 18-22, 2019, pp. 1-11, R1-1912049.

Intel Corporation, "Considerations on PDCCH-based power saving signal", 3GPP TSG-RAN WG1 #98-bis, Chongqing, China, Oct. 14-20, 2019, R1-1910671, pp. 1-10.

Huawei, et al., "WUS collision with DRX active time", 3GPP TSF-RAN WG2 Meeting #107, Prague, Czech Republic, Aug. 26-30, 2019, R2-1911243, pp. 1-7.

* cited by examiner

WAKE-UP SIGNAL MONITORING OPTIMIZATION

TECHNICAL FIELD

The present disclosure relates generally to discontinuous reception (DRX) by a wireless device in a wireless communication network and, more particularly, to wake-up signal monitoring in combination with DRX to further reduce power consumption of the wireless device.

BACKGROUND

One of the power-consuming activities of a user equipment (UE) in an Radio Resource Control (RRC)_CONNECTED mode is to monitor the Physical Downlink Control Channel (PDCCH). In this mode, the UE needs to perform blind detection in its configured control resource sets (CORESETs) to identify whether downlink control information (DCI) is sent to the UE on the PDCCH. On the other hand, the UE is not scheduled in most PDCCH monitoring occasions and thus, the UE monitoring is in almost all cases a waste of energy.

In Release 15, discontinuous reception (DRX) is used to reduce energy consumption. In DRX mode, the UE will start an inactivity timer after a scheduling PDCCH is successfully decoded by the UE. Once the inactivity timer expires, the UE will go to sleep following a certain pattern of sleep and OnDurations, the so-called DRX cycle. Using this DRX technique, the network will only transmit DCI scheduling the UE for a downlink transmission during the OnDuration of the DRX cycle. Therefore, the UE only needs to monitor the PDCCH in those OnDurations and can sleep between the OnDurations in consecutive DRX cycles to save energy. Although DRX reduces energy consumption, DRX still requires the UE to wake-up quite frequently, especially when the length DRX cycle is relatively short. Also, the UE will waste a significant amount of energy when the OnDuration is relatively long with respect to the duration of the DRX cycle.

Given the drawbacks of DRX, techniques that can reduce unnecessary PDCCH monitoring occasions during the OnDuration of the DRX cycle would be helpful in reducing power consumption further. The introduction of a wake-up signal (WUS) can be considered as one of the efficient solutions to improve UE power consumption. When a WUS is employed, the network will send a WUS to the UE before the start of the next OnDuration of the DRX cycle if it expects to send DCI scheduling a downlink transmission to the UE. When a WUS is implemented, the UE's default behavior is to wake-up and monitor the PDCCH in the next OnDuration of the DRX cycle only when a WUS is detected. If no WUS is detected, the UE remains in a sleep mode during the next OnDuration. The WUS itself will be sent by the network when there is data in the buffer to be transmitted to the UE. By allowing the UE to conduct PDCCH monitoring only when there will be a transmission on the Physical Downlink Shared Channel (PDSCH), the UE energy consumption can be significantly reduced. In addition, WUS monitoring can be set to be more power-efficient compared to that of the normal PDCCH monitoring and thus, improves the UE energy efficiency even further.

One of the drawbacks to using WUS is due to the fact that the UE may not always successfully detect/decode the WUS in the WUS monitoring occasions even when the network sends a WUS to wake-up the UE for the next OnDuration. In this case, the UE remains in a sleep state and will miss the scheduling PDCCH from the network during the OnDuration. In this case, the scheduled data transmission on the PDSCH will not be received by the UE. A "missed" WUS increases latency and reduces throughput. Even worse, when the UE misses the PDSCH transmission from the network for several occasions and fails to provide expected acknowledgement (ACK) or negative acknowledgement (NACK) feedback, a radio link failure (RLF) may be declared resulting in a loss of the and disruption of service. In this case, the UE needs to reestablish the connection, which requires a significant amount of power. The potential power saving, therefore, can be significantly diluted due to "missed" WUS detection.

Another potential drawback of the WUS solution is that the UE needs to wake-up twice when data is transmitted from the network to the UE, i.e., once to monitor the WUS monitoring occasions and a second time during the next OnDuration of the DRX cycle. When WUS is not implemented, the UE needs only to wake-up once, i.e., during the OnDuration of the DRX cycle. When there are frequent data transmissions from the network to the UE, the power saving gain from using the WUS can be significantly reduced ad may in some circumstances increase power consumption. In addition, the UE may not be able to return to a deep sleep in the gap between the WUS monitoring occasion and the OnDuration. The UE may need to remain awake, or return to a shallower sleep state, which consumes more power than a deep sleep.

SUMMARY

The present disclosure provides methods and apparatus for WUS monitoring and PDDCH monitoring and for adapting UE procedures based on WUS transmitted by a base station. In one embodiment, a UE can be configured to selectively skip WUS monitoring based on a current UE context. In another embodiment, WUS/PDCCH monitoring and/or other UE procedure can be adapted based on a statistic related to the WUSs transmitted by the base station to the UE.

The methods and apparatus herein described enable a more efficient UE power consumption and avoids PDCCH reception quality degradation, particularly when the WUS reliability is quite limited. Further, the disclosure presents techniques that exploit WUS statistical data to assist the UE so that the UE can actively conduct efficient procedures related to WUS monitoring and efficient responses towards WUS commands, and thus, optimize the UE power consumption and reduce network cost caused by unsuccessful WUS detection.

A first aspect of the disclosure comprises methods implemented by a UE of WUS monitoring. In one embodiment, the method comprises selectively monitoring a WUS monitoring occasion preceding the OnDuration of a DRX cycle for a WUS depending on a predetermined criterion. The method further comprises waking during a corresponding OnDuration of the DRX cycle and monitoring the downlink control channel when monitoring of the WUS monitoring occasion is skipped.

A second aspect of the disclosure comprises a UE configured to perform the method according to the first aspect. In one embodiment, the UE includes an interface circuit for communicating with a base station and a processing circuitry. The processing circuitry is configured to selectively monitor a WUS monitoring occasion preceding the OnDuration of a DRX cycle for a WUS depending on a predetermined criterion. The processing circuitry is configured to waking during a corresponding OnDuration of the DRX cycle and monitoring the downlink control channel when monitoring of the WUS monitoring occasion is skipped.

A third aspect of the disclosure comprises method for adapting a UE procedure based on WUSs transmitted by a base station. In one embodiment, the method comprises determining a statistical property of the WUSs transmitted by the base station. The method further comprises preemptively adapting a UE procedure based on the statistical property of the WUSs transmitted by the base station.

A fourth aspect of the disclosure comprises a UE configured to perform the method according to the third aspect. In one embodiment, the UE includes an interface circuit for communicating with a base station and a processing circuitry. The processing circuitry is configured to determine a statistical property of the WUSs transmitted by the base station. The processing circuitry is configured to preemptively adapt a UE procedure based on the statistical property of the WUSs transmitted by the base station.

A fifth aspect of the disclosure comprises a computer program product comprising executable instructions, that when executed by a processing circuitry in a UE, causes the UE to perform the method according to the first aspect.

DETAILED DESCRIPTION

Figure 1:
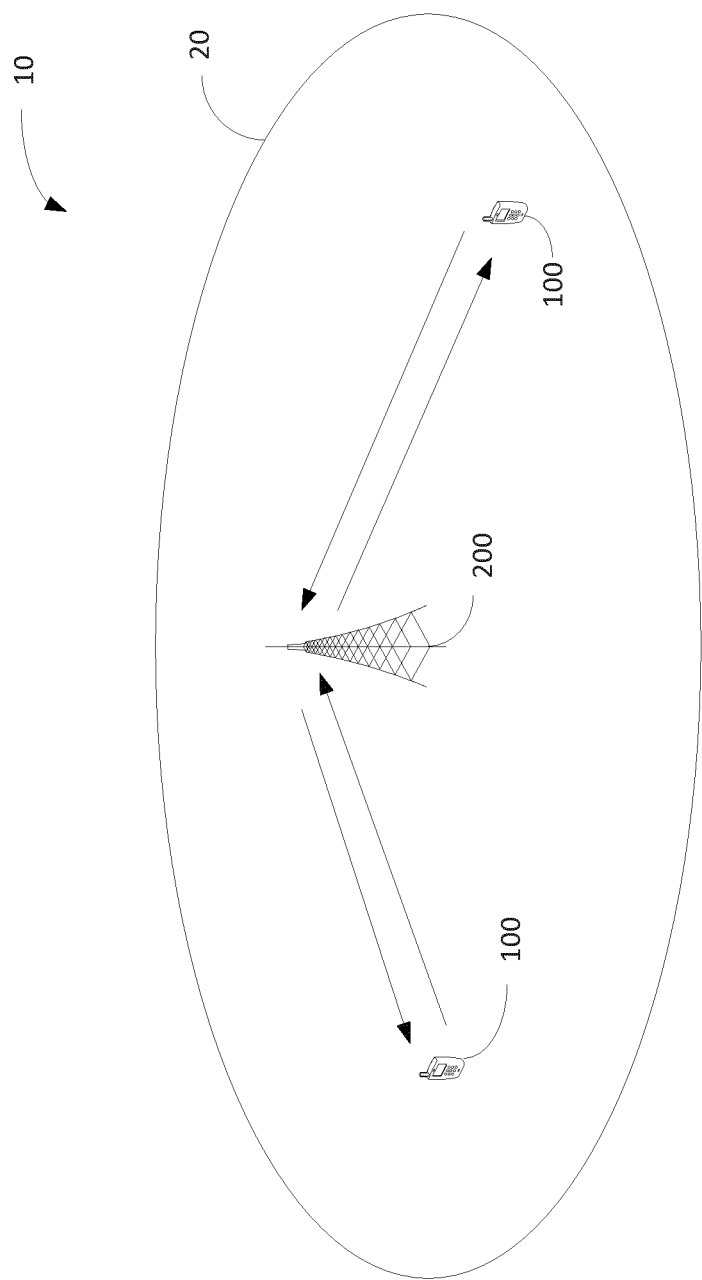
FIG. 1 illustrates a wireless communication network configured to implement WUS monitoring as herein described.

Referring now to the drawings, an exemplary embodiment of the present disclosure will be described in the context of Fifth Generation (5G) and Next Radio (NR) communication network. The power saving techniques herein described can be easily adapted by those skilled in the art for use in communication networks based on other radio access technologies (RATs), such as Long Term Evolution (LTE) networks, Wideband Code Division Multiple Access (WCDMA) networks, Code Division Multiple Access (CDMA) 2000 networks, Wireless Fidelity (WiFi) networks, Worldwide Interoperability for Microwave Access (WiMAX) networks, Wireless Local Area Networks (LANs) (WLANs), Narrowband Internet of Things (NB-IoT) networks, or other wireless communication networks.

FIG. 1 illustrates a wireless communication network 10 comprising a base station 200 providing service to user equipment (UE) 100 in a cell 20 served by the base station 200. The base station 200 is sometimes referred to in applicable standards as an Evolved Node B (eNB) or 5G Node B (gNB). The UE 100, also referred to as a wireless device or wireless terminal, may comprise a cellular telephone, smart phone, laptop computer, notebook computer, tablet, machine-to-machine (M2M) communication devices (also referred to as machine-type communication (MTC) devices), or other devices with wireless communication capabilities. Although only a single cell 20 is shown, those skilled in the art will appreciate that a typical wireless communication network 10 can comprise many cells 20.

Figure 2:
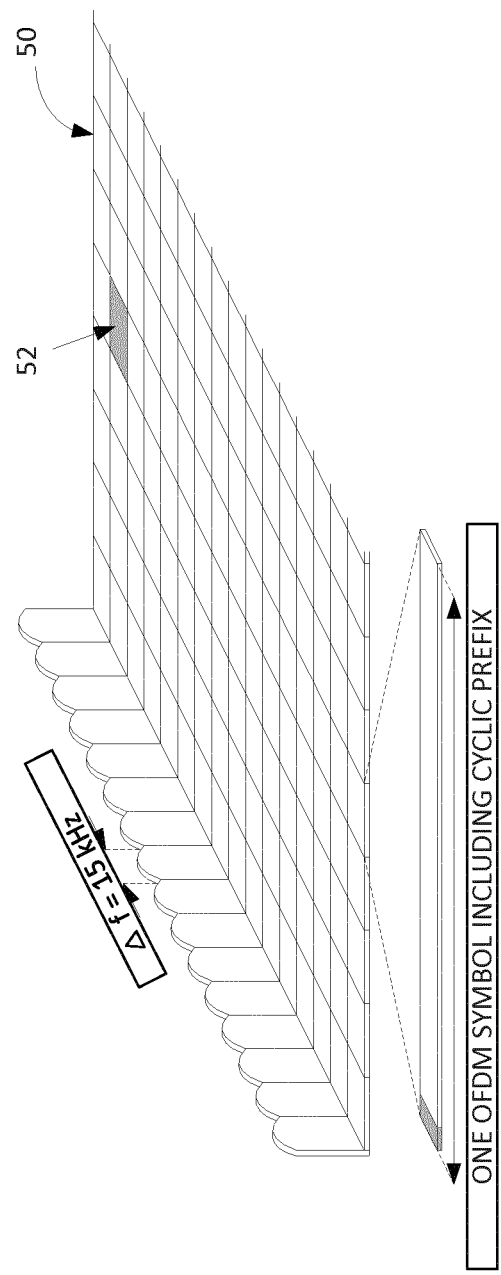
FIG. 2 illustrates the time-frequency resources used for communication in the wireless communication network.

The radio resources in NR can be viewed as a time-frequency grid 50 as shown in FIG. 2. In the time domain, the physical resources are divided into subframes. Each subframe includes a number of symbols. For a normal Cyclic Prefix (CP) length, suitable for use in situations where multipath dispersion is not expected to be extremely severe, a subframe comprises fourteen symbols. A subframe comprises twelve symbols if an extended CP is used. In the frequency domain, the physical resources are divided into subcarriers. The number of subcarriers varies according to the allocated system bandwidth. A subframe typically comprises two time slots, which may be further subdivided into mini-slots. A mini-slot comprises one or more symbol periods in a time slot. The smallest element of the time-frequency grid 50 is a resource element (RE) 52, which comprises the intersection of one subcarrier and one symbol.

The Third Generation Partnership Project (3GPP) is defining technical specifications for New Radio (NR) (e.g., 5G). In release 15 (Rel-15) NR, a UE 100 can be configured with up to four carrier bandwidth parts (BWPs) in the downlink (DL) with a single DL carrier BWP being active at a given time. A UE 100 can be configured with up to four carrier BWPs in the uplink (UL) with a single UL carrier BWP being active at a given time. If a UE 100 is configured with a supplementary UL, the UE 100 can additionally be configured with up to four carrier BWPs in the supplementary UL with a single supplementary UL carrier BWP being active at a given time.

For a carrier BWP with a given numerology $\mu_i$, a contiguous set of physical resource blocks (PRBs) are defined and numbered from 0 to $N_{BWP,j}^{size}-1$, where i is the index of the carrier BWP. A resource block (RB) is defined as 12 consecutive subcarriers in the frequency domain.

Multiple orthogonal frequency-division multiplexing (OFDM) numerologies, $\mu_i$, are supported in NR as given by Table 1 below, where the subcarrier spacing, $\Delta f$, and the cyclic prefix for a carrier bandwidth part are configured by different higher layer parameters for DL and UL, respectively.

TABLE 1

| Supported transmission numerologies. | | |
| --- | --- | --- |
| μ | $\Delta f = 2^\mu \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |

The base station 200 transmits information to the UE 100 on physical DL channels. A physical DL channel corresponds to a set of REs carrying information originating from higher layers. The physical DL channels currently defined include the PDSCH, PDCCH and the Physical Downlink Broadcast Channel (PBCH). The PDSCH is the main physical channel used for unicast DL data transmission, but also for transmission of random access responses (RARs), certain system information blocks (SIBs), and paging information. The PDCCH is used for transmitting downlink control information (DCI), mainly scheduling decisions, required for reception of the PDSCH, and for UL scheduling grants (SGs) enabling transmission on Physical Uplink Shared Channel (PUSCH). The PBCH carries the basic system information (SI) required by the UE 100 to access the network 10.

The base station 200 is responsible for scheduling DL transmissions to the UE 100 on the PDSCH and for allocating resources for the DL transmissions. The base station 200 sends downlink control information (DCI) to the UE 100 on the PDCCH to schedule a DL transmission UE 100. The DCI includes scheduling information such as the allocated resources for the DL transmission and the modulation and coding scheme (MCS).

The UE 100 transmits information to the base station 200 on physical UL channels. A physical UL channel corresponds to a set of REs carrying information originating from higher layers. The physical UL channels currently defined include the Physical Uplink Shared Channel (PUSCH), the Physical Uplink Control Channel (PUCCH) and the Physical Random Access Channel (PRACH). The PUSCH is the UL counterpart to the PDSCH. The PUCCH is used by UEs 100 to transmit UL control information (UCI), including Hybrid Automatic Repeat Request (HARQ) acknowledgements, channel state information (CSI) reports, etc. The PRACH is used for random access preamble transmission.

The base station 200 is responsible for scheduling UL transmissions from the UE 100 and for allocating resources for the UL transmissions. After scheduling an UL transmission and allocating resources, the base station 200 sends a scheduling grant (SG) to the UE 100 indicating the resources on which the UE 100 has been scheduled and the transmission format for the scheduled transmission. The UL grant is sent to the UE 100 on the PDCCH. After receiving the UL, the UE 100 determines the UL transmit power for the transmission and transmits data to the base station 200 on the PUSCH resources indicated in the SG.

Discontinuous reception (DRX) is a technique for conserving power in a UE 100. DRX allows UE 100 to transition to lower power state or "sleep mode" when it is not required to receive DL transmissions from the base station 200 and to wake-up periodically to monitor for paging messages and scheduling information.

Figure 3:
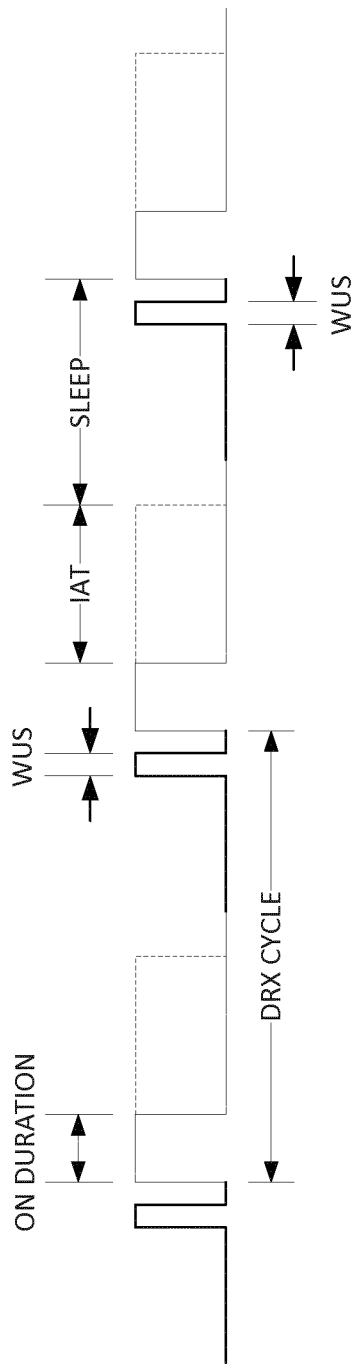
FIG. 3 illustrates an exemplary DRX cycle with a WUS monitoring occasion.

FIG. 3 illustrates DRX operation in simplified form. A DRX cycle is defined by a DRX period and an OnDuration during which the UE 100 wakes-up and monitors the PDCCH for DCI addressed to the UE 100. If the UE 100 detects DCI addressed to the UE 100, the UE 100 starts an inactivity timer (IAT) and continues to monitor the PDCCH until the inactivity timer expires. The inactivity timer determines the number of consecutive PDCCH-subframe(s) or slots during which the UE 100 will remain awake after the subframe or slot in which the PDCCH indicates an initial UL, DL or sidelink (SL) data transmission for the UE 100. If the UE 100 receives DCI addressed to the UE 100, it extends or resets the inactivity timer and continues to monitor the PDCCH. When the inactivity timer expires, the UE 100 has the opportunity to sleep until the beginning of the next OnDuration. In one embodiment the UE 100 stops receiving transmissions from base station 200 (e.g., no control monitoring) when the inactivity timer expires and goes to sleep until beginning of the next DRX cycle. The OnDuration and the time duration during which the inactivity timer is running is generally referred to as active time.

DRX functionality is typically configured by Radio Resource Control (RRC), which operates on a slower time scale than the Medium Access Control (MAC) layer or physical layer.

Thus, the DRX parameter settings cannot be changed as fast through RRC While DRX reduces power consumption of the UE 100, the UE 100 still needs to wake-up quite frequently, especially when the DRX cycle length is relatively short. Also, the UE 100 can waste a significant amount of power when the OnDuration is relatively long with respect to the duration of the DRX cycle To further reduce power consumption when downlink transmissions to the UE 100 are infrequent, the network can send a WUS to the UE 1000 before the start of the OnDuration as shown in FIG. 3. The UE 100 can be configured to wake-up to monitor for the WUS during a WUS monitoring occasion. If a WUS is detected, the UE 100 wakes-up on the next OnDuration of the DRX cycle to monitor the PDCCH. the UE 100 can enter a microsleep state in the gap between the WUS monitoring occasion and the start of the next OnDuration, or can remain awake. If no WUS is detected during the WUS monitoring occasion, the UE 100 returns to a sleep mode and sleeps through the next OnDuration of the DRX cycle.

Generally, use of the WUS is expected to be beneficial from a power consumption stand-point. However, the use of a WUS can increase power consumption in scenarios where the UE 100 is expected to receive frequent downlink transmissions. In this case, the UE 100 needs to wake twice; once to monitor the WUS and once to monitor the PDCCH. Waking to monitor the WUS consumes some power. Additionally, the UE 100 may not be able to return to a deep sleep state between the WUS monitoring occasion and the next OnDuration of the DRX cycle. Rather, the UE 100 may remain awake or return to a more shallow sleep state (e.g., microsleep mode), which consumes more power than a deep sleep state. The additional power consumption depends on the WUS configuration (e.g., aggregation level (AL), bandwidth (BW), transmission power), DRX configuration (e.g., DRX offset, DRX cycle, DRX OnDuration), WUS offset, the number of WUS monitoring occasions in each DRX cycle, and the location of the other UE measurements occasions (e.g., synchronization signaling block (SSB)) relative to the WUS and DRX OnDuration.

Also, problems may arise when the UE 100 is not able to reliably receive a WUS even when the network adapts WUS transmission to a robust configuration (e.g., through higher aggregation level (AL), higher power, using multiple WUS occasions/transmissions, etc.). A "missed" WUS may occur, for example, when the UE 100 is mobile and the WUS adaptation is based on "old" channel information. A "missed" WUS can also occur when an ambitious format for the WUS is used (e.g., high payload in the WUS, etc.). In the group-WUS scenario, the network may decide to send WUS with resources considered as robust only for the majority of the UEs 100 in that group to save the network resources. Some users in the same group may have bad channel conditions (relative to other UEs in that group). For the UEs 100 with bad channel conditions, the WUS configuration might not be sufficient. When the UE 100 misses the WUS, the UE 100 may also miss multiple PDCCH/PDSCH transmissions, which could trigger declaration of a RLF. The UE 100 then needs to reconnect to the network, with an associated delay and additional energy consumption for the UE 100. The costs of the costs of missed-WUS may be significantly high.

One aspect of the present disclosure is an adaptive mechanism that enables the UE 100 to recognize scenarios or conditions where the benefits from use of the WUS may be limited and/or the likelihood and costs of unsuccessful WUS reception may be high. If the cost/benefit trade-off is unfavorable to the UE 100, the UE 100 may omit WUS monitoring (i.e., intentionally ignore available WUS signals) and directly wake-up in the OnDuration, at least temporarily.

Some scenarios may be based on the performance impact of WUS handling attributable to data traffic patterns. For example, WUS monitoring may not be useful when the UE 100 is expecting data traffic in an upcoming OnDuration of the DRX cycle. Data traffic may be expected based on traffic pattern associated with an application, a past traffic pattern, or a scheduled download.

Some scenarios may be based on the performance impact of WUS handling attributable to reception conditions. Some such example scenarios detectable by UEs include high vehicular speed, frequent RLFs while configured with WUS, frequent reception of WUS-like signals that were not successfully decoded, etc.

Additionally, some scenarios may be based on UE power consumption associated with WUS handling attributable to a UE configuration. Such example scenarios include improper configuration of DRX cycle compared to the traffic, inappropriate configuration of the WUS offset or MCS, DRX offset, and measurement location, non-power-constrained configuration, etc.

Some scenarios may be based on the performance impact of WUS handling attributable to reception conditions. Some such example scenarios detectable by UEs include high vehicular speed, frequent RLFs while configured with WUS, frequent reception of WUS-like signals that were not successfully decoded, etc.

Generally, the UE 100 is configured for DRX while in an RRC_Connected state. Additionally, WUS monitoring is configured for the UE 100. More specifically, UE 100 is configured with one or more WUS monitoring occasions X slots before the OnDuration. If no WUS is detected/decoded by the UE 100 during a WUS monitoring occasion, the default option for the UE 100 is to skip monitoring PDCCH search space (SS) in the next DRX OnDuration. In embodiments of the present disclosure, criterion are defined for adapting WUS monitoring. The criterions may, for example, be related to expected data traffic, a UE configuration, reception conditions, or any combination thereof. The UE 100 determines whether any one of the criterion are met and, if so adapts WUS reception and PDDCH monitoring based on the fulfillment of the criterion. As one example, the UE 100 may skip WUS monitoring in the next WUS monitoring occasion and wake-up in the next OnDuration of the DRX cycle to monitor the PDCCH. As another example, the UE 100 may ignore a negative detection result and wake-up in the next OnDuration of the DRX cycle to monitor the PDCCH to avoid problems that may arise in the event of a "missed" WUS.

The following describes some of the scenarios where the UE 100 may modify WUS monitoring and PDCCH monitoring.

Adaptation Based on Expected Traffic

In mobile communication, the UE 100 has an awareness of the currently running applications, and thus, the UE 100 has knowledge of the history of the past traffic and can statistically anticipate the upcoming traffic. If based on this knowledge, the UE 100 determines that it expects to receive data on the next OnDuration, the UE 100 can deliberately skip the WUS monitoring in that particular WUS monitoring occasion.

In one such embodiment, for example, the UE 100 may observe that video streaming buffer-filling bursts arrive at certain regular intervals, which is likely in low-loaded networks and at a regular streaming bit rate. The UE 100 may skip WUS monitoring and directly wake-up to monitor PDCCH in the OnDurations where the next buffer-filling burst is anticipated.

In another example, the UE 100 can expect arrival of uplink (UL) data, skip WUS monitoring and send a scheduling request (SR) to the base station. If transmission of the SR is not allowed, the UE 100 can start a random-access process.

In another embodiment, the UE 100 exploits its knowledge of expected content in order to estimate the expected traffic. For example, if the UE 100 expects to download a movie, then it can skip WUS and wake-up for the OnDurations as it expects a more regular flow of data. As another example, if the UE 100 is aware that the intended content is not downloaded within the existing OnDuration, it may decide to skip the next WUS monitoring occasions and monitor PDCCH in the next OnDuration.

Yet in another embodiment, the UE 100 estimates the WUS traffic itself. For example, the UE 100 employs a learning mechanism to assess the historical behavior of the base station 200. For example, the UE 100 may notice that base station 200 transmits a WUS with a specific statistic, and as such skip monitoring WUS if the probability of arrival of a WUS in the next occasion is higher than a specific threshold. Furthermore, the UE 100 may also learn base station behavior for specific traffic type, e.g., WUS statistics for Internet browsing, downloading a movie, interactive gaming and so on. Depending on the expected type of traffic, the UE 100 can adapt its selective WUS monitoring strategy.

Adaptation Based on Reception Conditions

One of the reasons that the UE 100 may fail to detect/decode the WUS is because the channel quality between the network and the UE 100 is not sufficient for the UE 100 to decode the WUS. This situation might occur, for example, because the channel quality of the UE 100 is bad. In addition, it is possible that the network does not have enough resources to send a robust WUS configuration considering the current channel quality. Using a less robust WUS configuration would be expected to result in an increase in the number of missed WUSs. In a group-WUS scenario, the majority of the UEs 100 in a group may have a much better channel condition, and thus the network may decide not to use the most robust configuration.

Monitoring for a WUS in the WUS monitoring occasions when the channel quality is bad may not be beneficial and waste energy. Therefore, if there is an indication that the latest channel quality (e.g., average channel condition, worst-case channel condition, etc.) is not sufficient to decode the WUS given the current WUS configuration, there is a high probability that the UE 100 will need to wake-up in the next OnDuration to avoid the missed detection scenario. In this case, the UE 100 can deliberately skip this WUS and wake-up during in the OnDuration of the DRX cycle without monitoring for the WUS. The indication can be obtained, for example, by historical data of the successfully detected/decoded WUS configurations or the number (or ratio) of radio link failures (RLFs) in the given the current channel quality.

In another embodiment, the UE 100 may ignore monitoring the WUS in a specific TCI state, if it notices that the channel quality in that TCI state is deteriorated and reliable detection of WUS may not be possible. For example, the UE 100 may be configured with a WUS CORESET for the latest known TCI state or a number of TCI states. In one approach, the UE 100 decides to skip WUS monitoring and wake-up during the OnDuration of the DRX cycle if the main TCI state is deteriorated. In another example, the UE 100 can decide to still monitor WUS in other TCI states if the channel quality is good enough for reliable WUS detection, and the power savings achieved from skipping the WUS monitoring is higher than the power consumption for WUS monitoring in multiple TCI states.

Reception conditions can also be impacted by UE mobility. A UE 100 moving at a high speed experiences a larger channel fluctuation compared to that of stationary UE 100. Thus, there is a possibility that the WUS configuration may be based on "old" channel information. Mobility, therefore, can be used as a parameter by the UE 100 in determining whether to monitor the WUS or to skip the WUS monitoring and wake-up directly in the OnDuration. For example, the UE 100 may decide to skip WUS monitoring and wake-up for the OnDuration of the DRX cycle, as soon as it starts to move, or it moves with a speed more than a predetermined threshold. In an extension of this idea, several ranges of UE 100 velocity (or Doppler spread) can also be used. Yet, in another approach, the UE 100 skips WUS monitoring if the mobility is in the angular domain, i.e., the UE 100 location is stable, but it rotates with some angular speed (or a combination of both). In this case, the UE 100 may decide to skip monitoring WUS and wake-up directly as the quality of beam for WUS reception cannot be assured.

Adaptation Based on UE Configuration

The UE configuration also plays important roles in determining the potential power saving gain that can be obtained by the UE 100. The UE configuration may comprise a DRX configuration, WUS configuration, measurement configuration, reference signal configuration, power configuration or other configuration that impacts power saving performance of WUS monitoring.

When the DRX and WUS features are active, it is possible that a duration of the OnDuration is not significantly larger (e.g., 2 slots) compared to that of the WUS monitoring (typically 1 slot). This, for example, can happen when the WUS is also activated in the Short-DRX, or the Long-DRX has a relatively short cycle. In some scenarios, it is even possible that WUS configuration includes more than one monitoring occasion and the power consumption ratio between the WUS monitoring and OnDuration increases. In this case, the power saving gain that can be obtained through WUS monitoring might significantly decrease. To optimize the power saving gain, the UE 100 can deliberately skip WUS monitoring and wake-up in the upcoming OnDuration. For example, the UE 100 may decide to skip monitoring the WUS for short DRX but monitor the WUS for long-DRX. In addition to power saving as a criterion, the UE 100 may also apply other criteria, e.g., expected traffic, mobility and so on. For example, if the expected load is high, the UE 100 may decide to skip WUS monitoring for short DRX altogether.

In some scenarios, it is possible that the UE 100 recognizes that the DRX cycle assigned by the network is equal to or larger than the traffic periodicity expected by the UE 100. In these scenarios, there is a very high probability that the WUS will be sent by the network in the WUS monitoring occasions to wake-up the UE 100 in the OnDuration. Accordingly, the UE 100 can skip the WUS monitoring and directly wake-up in the upcoming OnDuration when the DRX cycle length is greater than the periodicity of the data traffic.

When WUS is implemented, the UE 100 will monitor the WUS one or several slots before the OnDuration. If the WUS is detected, there is a high probability that the UE 100 should remain in a micro sleep (instead of light sleep or deep sleep) between the WUS monitoring occasion and the OnDuration of DRX cycle. This circumstance reduces the power saving that can be obtained by implementing WUS. Setting WUS offset to be large may not be beneficial because even if the UE 100 could go to a deeper sleep (e.g., light sleep), the UE 100 will experience the wake-up energy overhead twice (i.e., in the WUS monitoring occasions and in the start of the OnDuration). In addition, larger WUS offset will also cause throughput loss. As the type of sleep (i.e. micro-sleep, light sleep, or deep sleep) taken by UE 100 depends on the length of the sleep duration, skipping WUS monitoring might also bring the UE 100 into a deeper sleep state and save more energy than WUS monitoring would save. Therefore, the WUS and DRX offset can be considered as parameters when calculating the potential power saving gain in implementing WUS monitoring. The UE 100 then can decide whether it is better to monitor or to skip the WUS by considering these parameters. For example, if the distance between WUS monitoring and DRX OnDuration is above (or below) a certain threshold, the UE 100 can decide to skip WUS monitoring and wake-up directly in the OnDuration.

In addition to WUS monitoring, the UE 100 may to wake-up to perform periodic measurements (e.g., synchronization signaling block (SSB) measurements). When the location of WUS monitoring occasions is near in time to the measurement occasion, conducting WUS monitoring will not cause a significant increase in energy consumption because the UE 100 will need to wake-up only once. However, it is also possible that the WUS monitoring occasions and the measurement occasion are far apart and that the UE 100 will need to remain in the micro-sleep state (rather than in the deeper sleep state), or the UE 100 needs to wake-up twice. Therefore, the WUS monitoring occasions and measurement occasion can also be used by the UE 100 as parameters to determine whether WUS monitoring is needed. For example, if the distance between the WUS monitoring occasions and the UE 100 periodic measurement location is above or below a certain threshold, the UE 100 can decide to skip WUS monitoring and wake-up directly in the OnDuration.

The power consumption of the WUS monitoring depends on the WUS configurations, i.e., a more robust configuration (e.g., larger AL, BWP, CORESET, SS configuration, interleaved or non-interleaved CORESET, number of WUS monitoring occasions, etc.) consumes more power. The network may choose a more robust configuration, for example, when the UE 100 has a bad channel quality. In the group-WUS scenario, this can also happen when the UE 100 belongs to a group which has one or more UEs with bad channel quality. As the power consumption of the WUS monitoring can vary quite significantly, this power consumption can also be used as a parameter by the UE 100 to decide whether to monitor the WUS in the WUS monitoring occasions.

Use of Power Metrics

When the UE 100 fails to detect. i.e., misses, the WUS, the UE 100 can also miss multiple PDCCH/PDSCH transmission, which could trigger declaration of a RLF. The UE 100 then needs to reconnect to the network, with an associated delay and additional energy consumption for the UE 100. The UE 100, therefore, can estimate possible additional power consumption if an RLF is declared, and use this power metric as a parameter to determine whether or not the UE 100 should skip the WUS monitoring or ignore a detection result and wake-up directly in the OnDuration.

The decision of whether or not the UE 100 can skip the WUS and wake-up directly in the OnDuration can be accomplished in different manners. For example, the UE 100 can decide to skip the WUS monitoring if one of the parameter's value/condition mentioned above is larger/smaller than a certain threshold value. In other option, the UE 100 can decide to skip WUS monitoring if a certain number of parameter values/conditions are larger/smaller than certain threshold values. In yet another option, the UE 100 can examine the parameter's value in a sequential manner. For example, the UE 100 can decide to skip the WUS monitoring if the UE 100 mobility is above a certain threshold value (regardless of the value of the other parameters). If the UE 100 mobility is below the threshold value, the UE 100 then check the other parameters (e.g., WUS monitoring power consumption, DRX configuration, etc.) and make a decision accordingly. In a more advanced option, the UE 100 can multiply each gap between the observed values and the threshold values using a certain weighting function.

The decision whether to or not to skip the WUS monitoring can be applied to the UE 100 as one entity, or it can also be implemented in a more specific way, e.g., the UE 100 can decide to skip WUS monitoring in the particular BWP (s), component carrier (CCs), etc. and not to skip WUS in other BWPs or CCs.

In addition, the observed and the threshold values can be set as a fixed value, or it is also possible to set the threshold value depends on the configuration and/or the condition of the WUS transmission (e.g., the number of receive antennas, bandwidth, AL, WUS payload bits, mobility, etc.), or even the updated historical data. Furthermore, the observed and threshold values can be in terms of real value or the Boolean type of value.

Likely Undetected WUS Transmission

In some scenarios/embodiments, the UE 100 may experience frequent reception of WUS-like signals that were not successfully decoded. For example, the UE 100 may observe that REs corresponding valid RE sets according to the WUS search space are allocated with consistent power, differing from power in surrounding REs, in a manner that is consistent with WUS transmission, although those contents are not successfully decoded as WUS DCI or other power-saving signals. The UE 100 may use soft information of the decoder used for WUS decoding. The soft information with magnitudes exceeding a threshold may indicate RE contents compatible with WUS DCI, although the signal quality may not be sufficient for successful decoding. The UE 100 may then assume that the detected RE pattern corresponds to a WUS transmission and, upon detecting such a pattern, act as if a WUS has been detected for the associated OnDuration and monitor for scheduling PDCCH during slots specified in the search space.

Non-Constrained Power Supply

In some embodiments, the UE 100 may, unknown to the network, be operating in a mode where power/energy saving is not of a primary concern, e.g., connected to a charger or permanently installed with unlimited power supply. In such scenarios, when the UE 100 is aware of such operating mode, it may circumvent any steps in PDCCH reception that are aimed at power saving but may infer performance degradation. For example, the UE 100 may omit any WUS detection and act at each OnDuration/SS occasion as if the WUS was received for the current OnDuration. This avoids any PDCCH reception degradation due to possible WUS missed detection and makes the PDCCH/PDSCH reception performance statistics more robust for the UE 100, at a cost of additional energy consumption which in the described scenarios is inconsequential.

Other Aspects

In a case where the WUS contains information related to the configuration in which the UE 100 needs to wake-up (e.g., transmission rank for multiple-input, multiple-output (MIMO), BWP, etc.), the UE 100 could wake-up in the most probable configurations. In addition, it is also possible that the UE 100 wakes-up with the configuration proportional to the configuration probability. For example, if in the historical data the UE 100 uses BWP1 80% and BWP2 20% in the transmission, the UE 100 can autonomously wake-up in the OnDuration using BWP1 80% of the time and BWP2 20% of the time respectively.

In a case where network sends a WUS followed by an aperiodic CSI-RS prior to the OnDuration, the UE 100 could also wake-up during the aperiodic CSI-RS beside the OnDuration. Here, the CSI report can also act as an indicator that the UE 100 will wake-up in the upcoming OnDuration even if the UE 100 deliberately skips the WUS monitoring.

In some extensions, the UE 100 can also send an indication to the network that the UE 100 intends to deliberately skip WUS monitoring in the given parameters/configurations mentioned above. The UE 100 may also a request to the network to not implement WUS. In these scenarios, the network can configure the UE 100 not to implement WUS when a similar configuration is detected.

The focus on skipping WUS monitoring by the UE 100 was on UE 100 skipping WUS monitoring and waking up in the next OnDuration. Alternatively, the UE 100 can (based on expected traffic, base station historical behavior, and so on) decide to skip monitoring WUS and not wake-up as far as the requirements set for WUS detection, e.g., WUS missed detection rate is satisfied.

Figure 4:
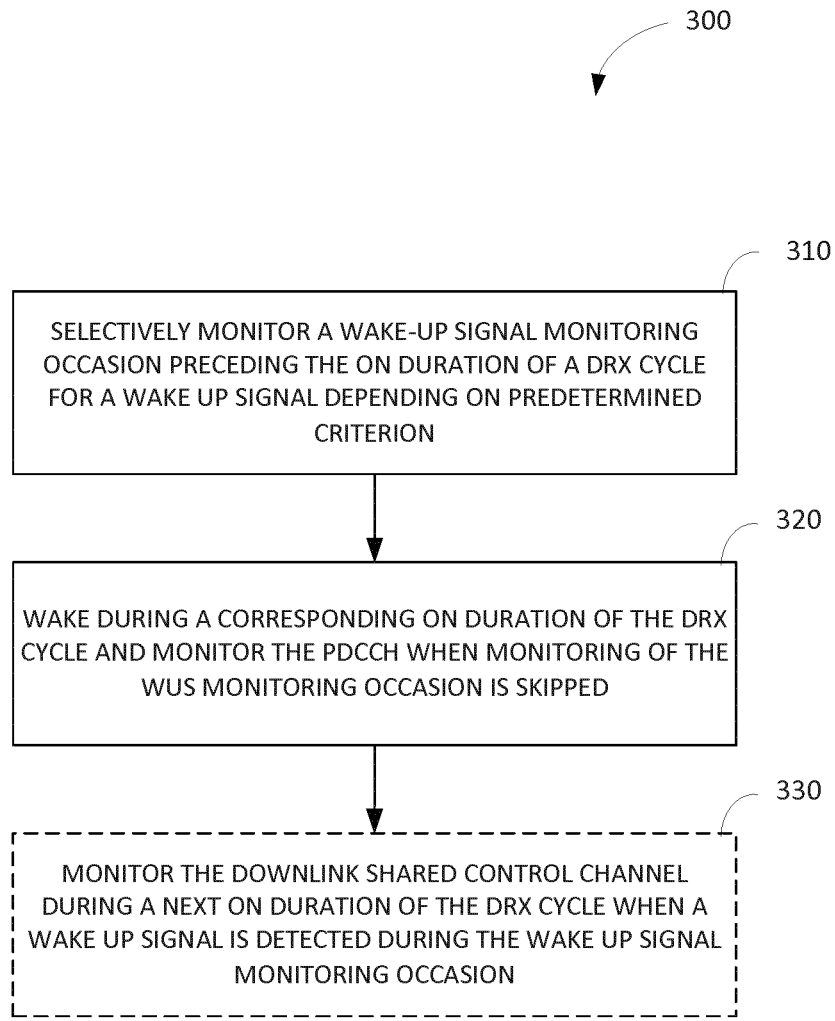
FIG. 4 illustrates an exemplary method of selective WUS monitoring.

FIG. 4 illustrates an exemplary method 300 implemented by a UE 100 implementing DRX in an RRC_Connected state. The method 300 assumes that PDCCH monitoring and WUS monitoring are already configured. Once PDCCH monitoring and WUS monitoring are configured, the UE 100 selectively monitors the WUS monitoring occasion preceding the OnDuration of the DRX cycle for a WUS depending on a predetermined criterion (block 310). For example, the UE 100 may wake to monitor for a WUS during some WUS monitoring occasions but skip other WUS monitoring occasions depending on the predetermined criterion. The predetermined criterion may relate to a current UE context. The UE 100 context may comprise an application or service that is currently running, a UE 100 configuration, a reception condition of the UE 100, or some combination thereof. The UE 100 further wakes during a corresponding OnDuration of the DRX cycle and monitors the PDCCH when monitoring of the WUS monitoring occasion is skipped (block 320). In some embodiments, the UE 100 further monitors the PDCCH during a next OnDuration of the DRX cycle when a WUS is detected during the WUS occasion (block 330).

Some embodiments of the method 300 further comprise remaining in a sleep mode during a next OnDuration of the DRX cycle when a WUS is not detected during the WUS occasion.

In some embodiments of the method 300, the predetermined criterion relates to expected data traffic, UE 100 configuration, reception conditions, or a combination thereof.

In some embodiments of the method 300, selectively monitoring a WUS monitoring occasion comprises skipping monitoring of the WUS monitoring occasion responsive to determining that data traffic is expected during the OnDuration of the DRX cycle. The expected data traffic may comprise downlink traffic or uplink traffic. As one example, the UE 100 can determine that data traffic is expected based on a traffic pattern of an application. As another example, the UE 100 can determine that data traffic is expected based on a scheduled download.

In some embodiments of the method 300, selectively monitoring a WUS monitoring occasion comprises skipping monitoring of the WUS monitoring occasion responsive to a reception condition. The reception condition may comprise, for example a channel quality, UE 100 mobility (e.g., velocity), or Transmit Configuration Indicator (TCI) state. In one example, monitoring of the WUS monitoring occasion is skipped when the channel quality is below a threshold. In another example, monitoring of the WUS monitoring occasion is skipped when the velocity of the UE 100 is greater than a threshold. In yet another example, WUS monitoring occasion is skipped depending the TCI state.

In some embodiments of the method 300, selectively monitoring a WUS monitoring occasion comprises skipping monitoring of the WUS monitoring occasion based on a UE configuration. The UE configuration may comprise a DRX configuration, WUS configuration, measurement configuration, reference signal configuration, power configuration or other configuration that impacts power saving performance of WUS monitoring.

In some embodiments of the method 300, WUS monitoring is skipped depending on the DRX configuration. For example, the UE 100 can skip WUS monitoring and monitor the PDCCH when a length of a current DRX cycle period is less than a predetermined length. In another example, the UE 100 can skip WUS monitoring and monitor the PDCCH when a current DRX cycle period is greater than a periodicity of expected data traffic. In yet another example, the UE 100 can skip WUS monitoring and monitor the PDCCH when a length of an OnDuration of a current DRX cycle is less than a predetermined length.

In some embodiments, wake-up single monitoring is skipped depending on the WUS configuration. For example, the UE 100 can skip WUS monitoring and monitor the PDCCH when an offset between the WUS monitoring occasion and start of the OnDuration of the DRX cycle is greater than a threshold. As another example, the UE 100 can skip WUS monitoring and monitor the PDCCH depending on a number of WUS monitoring occasion before the OnDuration of the DRX cycle.

In some embodiments of the method 300, WUS monitoring is skipped depending on the measurement configuration. For example, the UE 100 can skip WUS monitoring and monitor the PDCCH when a measurement occasion occurs during the next OnDuration of the DRX cycle, or when a time period between the WUS monitoring occasion and a measurement occasion meets a threshold.

In some embodiments of the method 300, WUS monitoring is skipped depending on the power configuration. For example, the UE 100 can skip WUS monitoring and monitor the PDCCH when the UE 100 is connected to an external power supply.

In some embodiments of the method 300, WUS monitoring is skipped depending on the reference signal configuration. For example, the UE 100 can skip WUS monitoring and monitor the PDCCH responsive to determining that a reference signal is expected during the next OnDuration of the DRX cycle, or when a time period between the next OnDuration of the DRX cycle and a measurement occasion meets a threshold.

In some embodiments of the method 300, selectively monitoring a WUS monitoring occasion comprises skipping monitoring of the WUS monitoring occasion dependent on a power saving metric. The power saving metric can be calculated based on one or more of expected power consumption during the WUS monitoring occasion, expected power saving if monitoring of the PDCCH is skipped in the OnDuration, or expected power consumption resulting from a missed WUS.

In some embodiments of the method 300, WUS monitoring is skipped and the PDCCH is monitored responsive to receipt of an indication from a base station.

In some embodiments of the method 300, the UE 100 selects a reception configuration for the OnDuration of the depending on historical usage of the reception configuration.

According to another aspect of the disclosure, the UE 100 collects base station behavior statistics regarding WUS transmissions and adapts the WUS and PDCCH monitoring processes accordingly to optimize power savings. Different types of statistical data from previous WUS monitoring occasions that can be used to assist the UE 100 in order to optimize the power saving gain and reduce the possible additional cost of carrying out WUS monitoring are outlined below. The statistical data can be in the form of WUS reception rate (e.g., the number of WUS that is actually transmitted by the base station 200 in a given number of WUS monitoring conducted by the UE), WUS transmission patterns, and the statistical data related to the commands that are contained in the WUS.

WUS Reception Rate

Most UE applications follow a certain traffic pattern which can be represented by data inter-arrival time (IAT) and packet size. Once the data arrives in the buffer at the base station 200, the base station 200 can send the WUS in one of the upcoming WUS monitoring occasions configured for the UE 100. From the UE 100 perspective, however, the WUS monitoring occasion is tied to the DRX cycle. In some scenarios, it is possible that the DRX cycle does not match the data IAT.

In one embodiment of the disclosure, a WUS reception rate can be defined as the average number of WUS monitoring occasions that are monitored by the UE 100 until a WUS is detected/decoded by the UE 100. In other option, WUS reception rate can also be defined as the total number of WUS that is successfully detected/decoded by the UE 100 divided by the total number of WUS monitoring occasions in one RRC connection.

In complement to the above, the UE 100 can store the WUS reception rate based on the traffic type, based on the DRX type, (e.g., long-DRX or short-DRX), etc. For example, for video streaming traffic, the WUS reception rate is X while for video call the WUS is reception rate is Y.

In yet another option, the UE 100 can relate the statistical behavior of base station 200 WUS transmission with the UE 100 uplink transmission. For example, the UE 100 can define the WUS reception rate as the number of DRX cycles between the WUS reception and the time that the UE 100 requested data.

In one embodiment, the UE 100 can use reception rate information to deliberately skip certain WUS monitoring occasions and straightforwardly wake-up during the OnDuration or follow the most likely commands contained in the WUS. Assume for example that the UE 100 is configured with a DRX cycle of 160 ms. Through the WUS statistic, the UE 100 has information that the WUS most likely occurs after 320 ms. In this case, the UE 100 can monitor for the WUS in the first WUS monitoring occasion (i.e., WUS monitoring occasion of the first DRX cycle) and go back to sleep if there is no data. In the second WUS monitoring occasion (i.e., WUS monitoring occasion of the second DRX cycle), the UE 100 actually expect a WUS to be transmitted based on the WUS statistic. Therefore, the UE 100 can skip the WUS monitoring occasion and wake-up in the OnDuration of the DRX cycle, or follow other most likely possible WUS commands.

The converse of the above described scenario is also possible, i.e., the UE 100 uses this WUS statistic to skip a WUS monitoring occasion and keep sleeping if it does not expect a WUS in the upcoming WUS monitoring occasion because of previous base station 200 WUS transmission pattern. This option may preferably be used if the base station 200 transmission pattern, at least regarding the omitted monitoring occasions, is highly consistent. Using this approach, the UE 100 may also consider the acceptable WUS detection rate (i.e., the ratio between the number of WUS that is successfully detected by the UE 100 divided by the number of WUS that is transmitted by the base station 20) set by the standard. The rate of incorrectly omitting WUS monitoring occasions with transmitted WUSs should not exceed the permissible WUS missed detection rate.

In another embodiment, the UE 100 uses the WUS statistic to send a request to the base station 200 to disable the WUS feature. This, for example, can be conducted when the UE 100 has statistical information that the WUS is always received in most of the WUS monitoring occasions. In such a case, according to the invention, the UE 100 would, in any case, skip WUS monitoring and perform PDCCH monitoring during each OnDuration of the DX cycle.

WUS Transmission Patterns

A WUS transmission is defined in terms of several configuration parameters. For example, a DCI-based WUS comprises a BWP, a number of CORESETS, and a number of search space configurations, as well as aggregation levels (ALs) and so on. The UE 100 may try to learn the base station 200 WUS behavior in this aspect as well, in order to optimize its power efficiency. For example, if the UE 100 is configured with two CORESETS for monitoring WUS, but the UE 100 recognizes that base station 200 always transmits WUS in a specific CORESET, or in a specific CORESET 90% of the time, the base station 200 may use this knowledge in order to narrow its search, or modify its hardware parameters in order to save additional power by first monitoring the specific CORESET where the WUS reception is most likely to occur. This aspect can be extended to the case of search space monitoring or possible AL values. The UE 100 may, for example, note that the base station 200 transmits WUS usually with a specific AL, or a minimum AL, or a maximum AL.

In one embodiment, the UE 100 learns the base station 200 WUS transmission patterns by learning the base station 200 behavior in a multi-beam scenario. If, for example, the UE 100 recognizes that the base station 200 always, or with a probability higher than a specific threshold, transmits WUS in the latest TCI state (beam), the UE 100 can configure its receiver to only monitor WUS in this TCI state. The UE 100 can further design robust techniques to avoid potential misalignment with base station 20. For example, the UE 100 may monitor the SSB and recognize that the channel quality in the latest known TCI state has probably deteriorated and thus, even if WUS is not received, the UE 100 ignores the detection result and decides to wake-up.

In a related approach, a UE 100 configured with multiple CORESETS for each TCI state, or any other similar TCI state WUS configuration, can learn base station 200 behavior with regard to WUS transmission for each specific TCI state configuration and optimize its own WUS monitoring to achieve power savings.

WUS Command Statistics

Besides waking up the UE 100, it is also possible that WUS contains certain commands that should be followed by the UE 100. The commands, for example, can specify configurations in which the UE 100 should wake-up (e.g., BWP, AL, etc.), or actions that should be taken by the UE 100 upon waking (e.g., send acknowledgement (ACK), CSI report, etc.). In one embodiment, the UE 100 uses WUS statistical information to determine a configuration that the UE 100 should use upon waking. For example, if from the historical data, the WUS commands specify will ask the UE 100 to wake-up in BWP1 for 80% of the time and in BWP2 for 20% of the time, respectively, the UE 100 can always wake-up in BWP1, or the UE 100 can wake-up in this probability (80% in BWP1, 20% in BWP2), when the UE 100 autonomously wakes-up. This can be extended for the other possible configuration such as the number of layers, etc.

In addition, the UE 100 could also use the statistical data on WUS commands to minimize unnecessary measurement. For example, if a UE 100 is configured by RRC to have a maximum number of transmission layers equal to 4 learns through the WUS statistics that it is always (or with a probability exceeding a certain threshold) awakened in a two-layer transmission, the UE 100 could omit the measurement (e.g., CSI-RS, SSB) for four layers transmission and instead, conduct measurement only for the two layers transmission.

In some embodiments, the UE 100 can also use the statistical data on WUS commands to prepare for data reception/transmission on additional component carriers (CCs) in carrier aggregation (CA) mode. If the WUS command frequently, or according to a consistent pattern, indicates data on certain or all Secondary Cells (SCells), those SCells may be prepared for activation ahead of time. On the other hand, if SCells are consistently not invoked in WUS, the SCell-related radio frequency (RF) hardware may be maintained in inactive hardware state.

In other embodiments, the UE 100 can use historical data related to WUS for UE 100 preparation towards certain actions. For example, if the base station 200 is likely to request the UE 100 to send CSI-report using a WUS command, the UE 100 can prepare the necessary actions (e.g., hardware preparations) to do uplink transmission in an advance manner rather than to wait until the WUS is successfully detected/decoded.

In some embodiments, the UE 100 may select or set UE parameters for a UE procedure based on WUS statistics.

In yet another aspect, the present disclosure defines actions that can be taken by the UE 100 based on those statistical data, e.g., skipping monitoring the configured WUS or disregarding its contents, preparing or skipping preparation for additional commands carried by WUS, etc.

Extensions

Because the invention is based on past statistics and probabilistic considerations, it is possible that, in some cases, the actions selected by the UE 100 may turn out to be suboptimal. In one embodiment, the UE 100 tracks the power consumption according to the chosen special action, e.g., omitting WUS reception and always monitoring the OnDuration, and in parallel estimates the power consumption if the default action would be performed, e.g. monitoring the WUS as configured. If the chosen action is suboptimal power from the perspective of power consumption, e.g. the power consumption difference exceeds a threshold, the UE 100 may revert to the default action. Note that omitting WUS monitoring has no adverse performance impact, only a UE 100 power consumption impact.

In a related embodiment, the UE 100 may also assess the impact of chosen actions regarding preparation for anticipated WUS commands, where some performance impact due to incorrect prediction may occur, e.g., when the UE 100 is not prepared for measurements or operation with a higher number of layers. The UE 100 estimates the rate of differences between predicted and actual WUS commands and may revert to the default behavior, being prepared for all possible WUS commands, if the rate of incorrect predictions or their estimated performance impact exceeds a threshold.

In some embodiments, the UE 100 may exit the special action mode if changes in traffic patterns are detected (at L1) or anticipated (e.g. based on application layer info from smartphone apps). The UE 100 may then repeat the base station 200 behavior learning process for the new traffic pattern to determine new suitable special actions.

Figure 5:
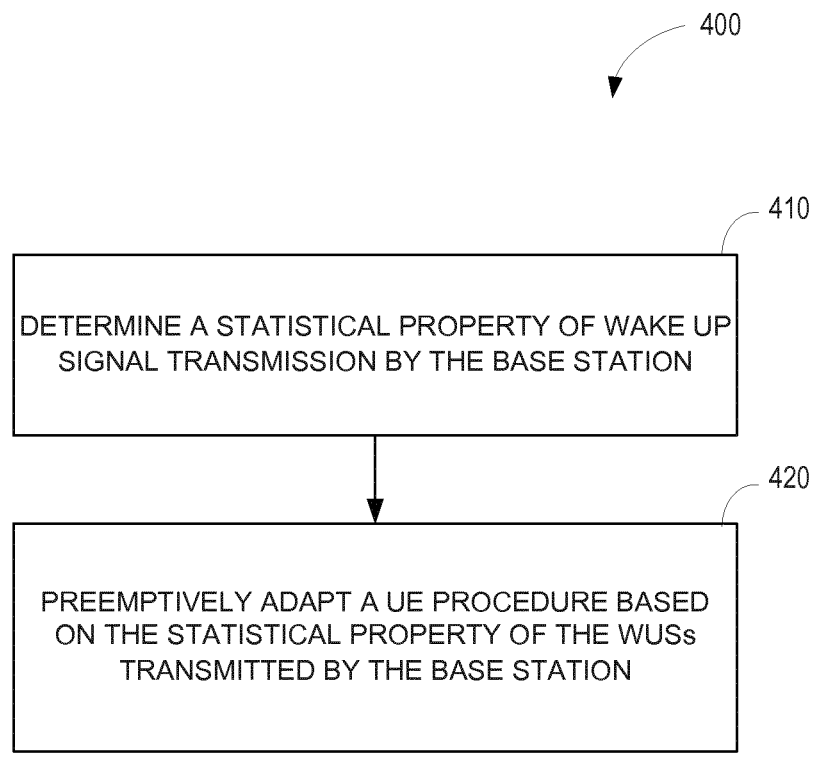
FIG. 5 illustrates an exemplary method of adapting a UE procedure based on WUSs transmitted by a base station.

FIG. 5 illustrates an exemplary method 400 implemented by UE 100 implementing DRX for using a statistical property of the WUSs transmitted by the base station 200 to preemptively adapt a UE procedure, such as a WUS monitoring procedure and/or PDCCH monitoring procedure. The method 300 assumes that the UE 100 is in an RRC_Connected state and that PDCCH monitoring and WUS monitoring are already configured. The default behavior of the UE 100 is to wake during the WUS monitoring occasion to monitor for a WUS. If a WUS is detected, the UE 100 wakes-up in the next OnDuration of the DRX cycle to monitor the PDCCH. In the method 400 shown in FIG. 5, the UE behavior is modified based on a statistical property of the WUSs transmitted by the base station. The UE 100 determines a statistical property of the WUSs transmitted by the base station 200 (block 410) and preemptively adapts a UE procedure based on the statistical property of the WUSs transmitted by the base station 200 (block 420).

In some embodiments of the method 400, the UE 100 adapts the default WUS and PDCCH monitoring procedures based on the statistical property of the WUSs transmitted by the base station 20. In one example, the UE 100 selectively monitors a WUS monitoring occasion preceding the OnDuration of the DRX cycle for a WUS based on the statistical property of the WUSs transmitted by the base station. The UE 100 further wakes during a corresponding OnDuration of the DRX cycle and monitors the downlink control channel when monitoring of the WUS monitoring occasion is skipped.

In some embodiments of the method 400, selectively monitoring a WUS monitoring occasion comprises skipping monitoring of the WUS monitoring occasion and waking during a corresponding OnDuration of the DRX cycle to monitor the PDCCH.

In some embodiments of the method 400, the statistical property is a reception rate of the WUSs and the UE 100 selectively monitors the WUS monitoring occasions depending on the WUS reception rate. In one embodiment, the reception rate is an average number of WUS monitoring occasions between detection of consecutive WUSs. In another embodiment, the reception rate is a number of WUSs detected divided by a total number of WUS monitoring occasions over a period of time. The period of time may, for example, comprise a duration of one RRC connection. In yet another embodiment, the reception rate comprises a number of DRX cycles between transmission of a scheduling request by the user equipment and detection of a WUS.

In some embodiments of the method 400, the WUS reception rate is traffic type specific, and wherein the UE selectively monitors the WUS monitoring occasion depending on the current traffic type and the reception rate for the current traffic type. In other embodiments of the method 400, the WUS reception rate is specific for a DRX configuration, and wherein the UE selectively monitors the WUS monitoring occasion depending on the current DRX configuration and the reception rate for the current DRX configuration.

In some embodiments of the method 400, selectively monitoring the WUS monitoring occasion further depends on a WUS detection rate. If adaptation of the WUS monitoring negatively impacts the WUS detection rate, then the adaptation can be modified.

In some embodiments of the method 400, selectively monitoring the WUS monitoring occasion comprises monitoring resources used for WUS monitoring in an order determined based on the statistical property of the WUS transmission. The resources for WUS transmission may, for example comprises a bandwidth part, CORESET, TCI state, or beam. As one example, the statistical property of WUS transmission is specific to a TCI state and the UE monitors the resources used for the WUS monitoring in an order depending on the current TCI state.

Some embodiments of the method 400 further comprise determining power consumption or power saving resulting from a specific WUS monitoring behavior, and further adapting WUS monitoring based on the power consumption or power saving associated with the WUS monitoring behavior.

In some embodiments of the method 400, preemptively adapting a UE procedure based on the statistical property of the WUSs transmitted by the base station comprises adapting PDCCH monitoring depending on the statistical property of the WUSs transmitted by the base station. Adapting PDCCH monitoring may comprise, for example, setting an aggregation level for PDCCH monitoring, or selecting a PDCCH search space from the configured search spaces.

In some embodiments of the method 400, preemptively adapting a UE procedure based on the statistical property of the WUSs transmitted by the base station comprises preemptively setting a parameter to perform the UE procedure depending on the statistical property of the WUS transmission.

In some embodiments of the method 400, preemptively adapting a UE procedure based on the statistical property of the WUSs transmitted by the base station comprises setting a parameter for measurement reporting depending on the statistical property of the WUS transmission. For example, the UE 100 may preemptively set a number of transmission layers for measurement reporting.

In some embodiments of the method 400, preemptively adapting a UE procedure based on the statistical property of the WUSs transmitted by the base station comprises selecting one or more secondary cells for carrier aggregation depending on the statistical property of the WUS transmission.

Some embodiments of the method 400 further comprise determining power consumption or power saving resulting attributable to the preemptive adaptation, and modifying a preemptive adaptation based on the power consumption or power saving associated with the preemptive actions.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
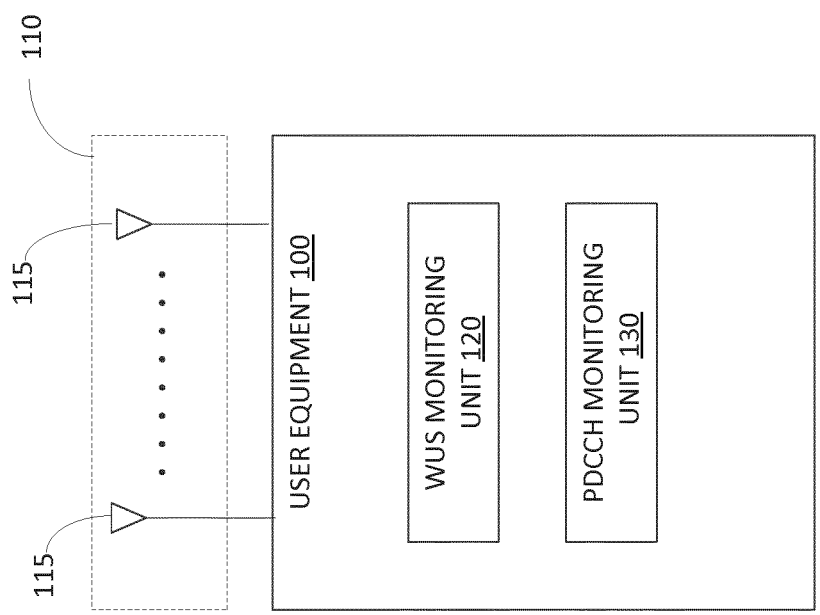
FIG. 6 illustrates an exemplary UE configured to perform selective WUS monitoring.

FIG. 6 illustrates a UE 100 according to an embodiment configured to perform the method 300 of FIG. 4. The UE 100 comprises an antenna array 110 having one or more antennas 115, a WUS monitoring unit 120 and a PDCCH monitoring unit 130. The various units 120-130 can be implemented by hardware and/or by software code that is executed by one or more processors or processing circuitry. The WUS monitoring unit 120 is configured to selectively monitor the WUS monitoring occasion preceding the OnDuration of the DRX cycle for a WUS depending on a predetermined criterion (e.g., current UE context). The PDCCH monitoring unit 130 is configured to monitor the PDCCH when monitoring of the WUS monitoring occasion is skipped by the WUS monitoring unit 120.

Figure 7:
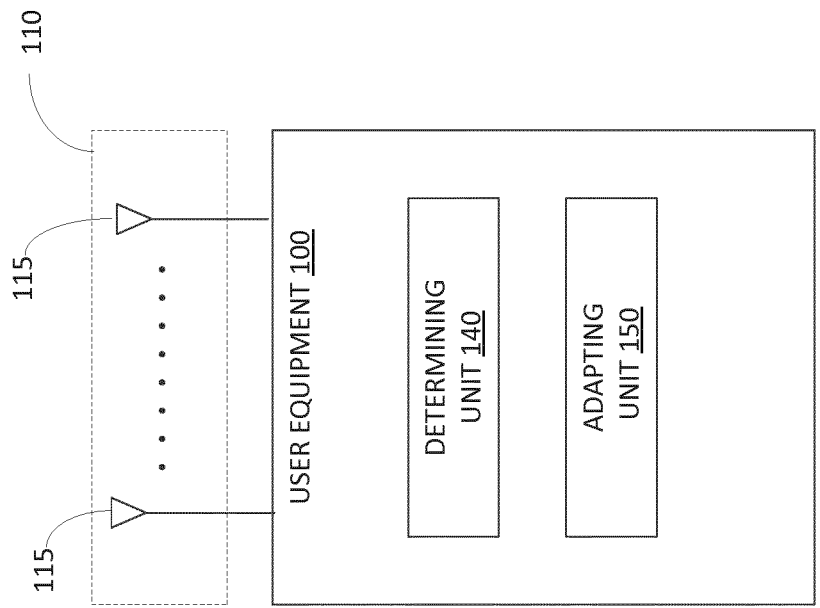
FIG. 7 illustrates an exemplary UE configured to adapt a UE procedure based on WUSs transmitted by a base station.

FIG. 7 illustrates a UE 100 according to an embodiment configured to perform the method 300 of FIG. 5. The UE 100 comprises an antenna array 110 having one or more antennas 115, a determining unit 140 and an adapting unit 150. The various units 140-150 can be implemented by hardware and/or by software code that is executed by one or more processors or processing circuitry. The WUS monitoring unit 140 is configured to selectively monitor the WUS monitoring occasion preceding the OnDuration of the DRX cycle for a WUS depending on a predetermined criterion (e.g., current UE context). The PDCCH monitoring unit 150 is configured to monitor the PDCCH during a next OnDuration of the DRX cycle when a WUS is detected during the WUS occasion.

The embodiments of the UE 100 shown in FIGS. 6 and 7 can be combined in a single UE 100. That is, the UE 100 according to another embodiment may comprise an antenna array 110 having one or more antennas 115, a WUS monitoring unit 120, a PDCCH monitoring unit 130a determining unit 140 and an adapting unit 150 as described above.

Figure 8:
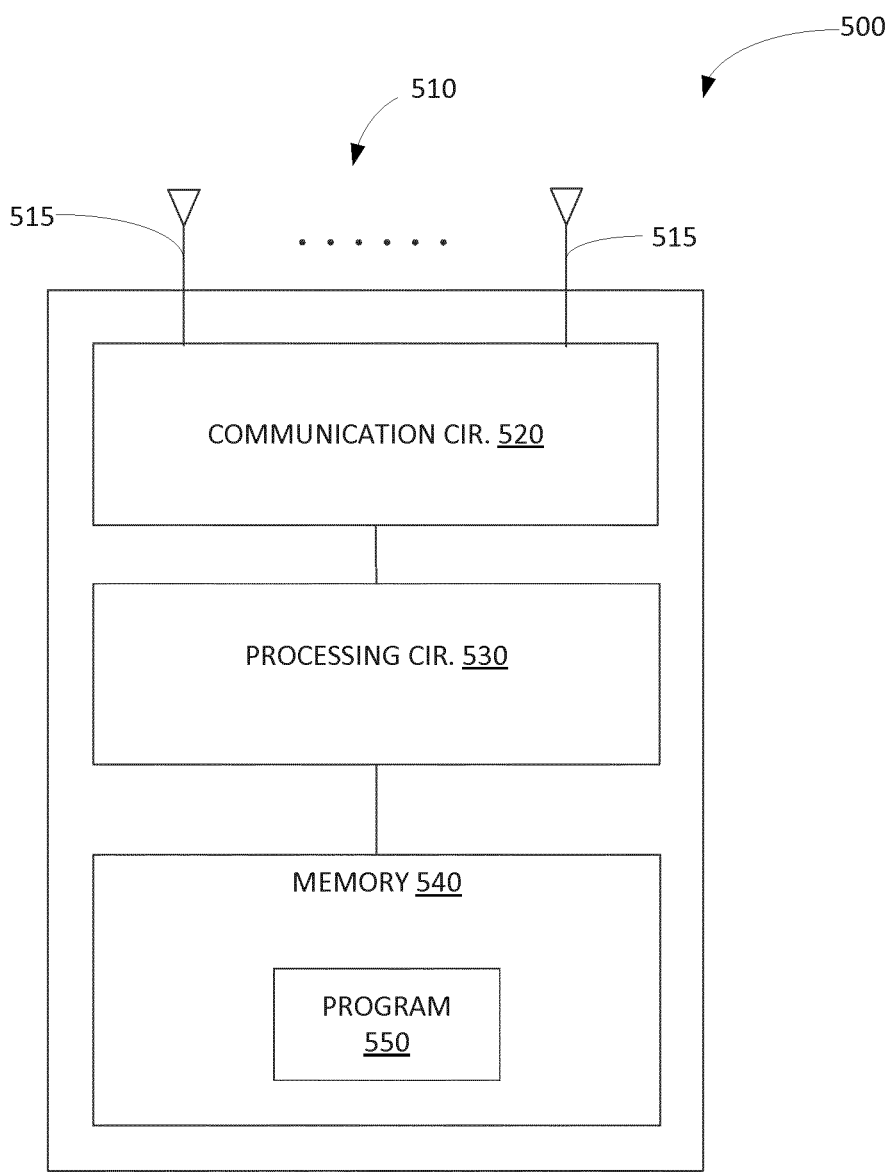
FIG. 8 illustrates an exemplary UE configured to perform selective WUS monitoring and adaptation of UE procedures based on WUSs transmitted by a base station.

FIG. 8 illustrates a UE 500 according to one embodiment that may be configured to implement WUS monitoring as herein described. The UE 500 comprises an antenna array 510 with one or more antenna elements 515, an interface circuit 520, a processing circuitry 530, and memory 540.

The interface circuit 520 is coupled to the antennas 515 and comprises the radio frequency (RF) circuitry needed for transmitting and receiving signals over a wireless communication channel. The RF circuitry may also enable direct communication over a sidelink with other UEs. In one exemplary embodiment, the interface circuit comprises an RF transceiver including a transmitter and receiver configured to operate according to the 5G or NR standards. In some embodiments, the interface circuitry may further enable connection to a Wireless Local Area Network (WLAN).

The processing circuitry 530 controls the overall operation of the UE 500 and processes the signals transmitted to or received by the UE 500. Such processing includes tasks such as coding and modulation of transmitted data signals, and the demodulation and decoding of received data signals. The processing circuitry 530 is configured to perform one or more of the methods 300, 400 shown in FIGS. 4 and 5 respectively. The processing circuitry 530 may comprise one or more microprocessors, hardware, firmware, or a combination thereof.

Memory 540 comprises both volatile and non-volatile memory for storing computer program code and data needed by the processing circuitry 530 for operation. Memory 540 may comprise any tangible, non-transitory computer-readable storage medium for storing data including electronic, magnetic, optical, electromagnetic, or semiconductor data storage. Memory 540 stores a computer program 550 comprising executable instructions that configure the processing circuitry 530 to implement one or more of the methods 300, 400 shown in FIGS. 4 and 5 respectively. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 550 for configuring the processing circuitry 530 as herein described may be stored in a removable memory, such as a portable compact disc, portable digital video disc, or other removable media. The computer program 550 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The techniques herein described enable a more efficient UE power consumption and avoids PDCCH reception quality degradation, particularly when the WUS reliability is quite limited. Further, the techniques described herein exploit WUS statistical data to assist the UE so that the UE can actively conduct efficient procedures related to WUS monitoring and efficient responses towards WUS commands, and thus, optimize the UE power consumption and reduce network cost caused by unsuccessful WUS detection.

What is claimed is:

1. A method of wake-up signal monitoring implemented by a user equipment (UE) during a discontinuous reception (DRX) mode, the method comprising:
   determining a statistical property of wake-up signals transmitted by the base station;
   selectively monitoring a wake-up signal monitoring occasion preceding the on duration of the DRX cycle for a wake-up signal based on the statistical property of the wake-up signals transmitted by the base station;
   waking during a corresponding on duration of the DRX cycle and monitoring the downlink control channel when monitoring of the WUS monitoring occasion is skipped;
   wherein the statistical property comprises a wake-up signal reception rate; and
   wherein selectively monitoring a wake-up signal monitoring occasion comprises selectively monitoring the wake-up signal monitoring occasions depending on the wake-up signal reception rate.

2. The method of claim 1, further comprising monitoring a downlink control channel during a next on duration of the DRX cycle when a wake-up signal is detected during the wake-up signal monitoring occasion.

3. The method of claim 1, wherein the wake-up signal reception rate comprises:
   an average number of wake-up signal monitoring occasions between detection of consecutive wake-up signals; or
   number of wake-up signals detected divided by a total number of wake-up signal monitoring occasions over a period of time; or
   number of DRX cycles between transmission of a scheduling request by the user equipment and detection of a wake-up signal.

4. The method of claim 1:
   wherein the wake-up signal reception rate is traffic type specific; and
   wherein the UE selectively monitors the wake-up signal monitoring occasion depending on the current traffic type and the reception rate for the current traffic type.

5. The method of claim 1:
   wherein the wake-up signal reception rate is specific for a DRX configuration; and
   wherein the UE selectively monitors the wake-up signal monitoring occasion depending on the current DRX configuration and the reception rate for the current DRX configuration.

6. The method of claim 1, wherein selectively monitoring the wake-up signal monitoring occasion further depends on a wake-up signal detection rate.

7. The method of claim 1, wherein selectively monitoring the wake-up signal monitoring occasion comprises monitoring resources used for wake-up signal monitoring in an order determined based on the statistical property of the wake-up signal transmission.

8. The method of claim 7, wherein the resource comprises:
   a bandwidth part or configured control resource set (CORESET); or
   a Transmit Configuration Indicator (TCI) state or beam.

9. The method of claim 7:
   wherein the statistical property of wake-up signal transmission is specific to a Transmit Configuration Indicator (TCI) state; and
   wherein the UE monitors the resources used for the wake-up signal monitoring in an order depending on the current TCI state.

10. The method of claim 1, further comprising:
    determining power consumption or power saving resulting from a specific wake-up signal monitoring behavior; and
    further adapting wake-up signal monitoring based on the power consumption or power saving associated with the wake-up signal monitoring behavior.

11. The method of claim 1, further comprising adapting downlink control channel monitoring depending on the statistical property of the wake-up signals transmitted by the base station.

12. The method of claim 11, wherein the adapting downlink control channel monitoring comprises setting an aggregation level for downlink control channel monitoring.

13. The method of claim 11, wherein the preemptively adapting the user equipment to perform a procedure comprises preemptively selecting a downlink control channel search space.

14. The method of claim 1, further comprising preemptively setting a parameter to perform the UE procedure depending on the statistical property of the wake-up signal transmission.

15. The method of claim 1, further comprising configuring or adapting measurement reporting depending on the statistical property of the wake-up signal transmission.

16. The method of claim 1, further comprising selecting one or more secondary cells for carrier aggregation depending on the statistical property of the wake-up signal transmission.

17. The method of claim 1, further comprising:
    preemptively adapting one or more of downlink control channel monitoring and measurement reporting based on the statistical property;
    power consumption or power saving resulting attributable to the preemptive adaptation; and
    modifying a preemptive adaptation based on the power consumption or power saving associated with the preemptive actions.

18. The method of claim 1, wherein the statistical property of the wake-up signals further comprises at least one of a distribution of the wake-up signals on resources used for wake-up signal transmission, and a probability of the wake-up signals occurring on resources used for wake-up signal transmission.

19. A user equipment (UE) in a wireless communication network comprising:

communication circuitry for communicating with a wireless communication network;
processing circuitry operative to:
determine a statistical property of wake-up signals transmitted by the base station;
selectively monitoring a wake-up signal monitoring occasion preceding the on duration of the DRX cycle for a wake-up signal based on the statistical property of the wake-up signals transmitted by the base station; and
waking during a corresponding on duration of the DRX cycle and monitoring the downlink control channel when monitoring of the WUS monitoring occasion is skipped:
wherein the statistical property comprises a wake-up signal reception rate; and
wherein selectively monitoring a wake-up signal monitoring occasion comprises selectively monitoring the wake-up signal monitoring occasions depending on the wake-up signal reception rate.

* * * * *